US012771276B2

(12) United States Patent
Kaidu et al.

(10) Patent No.: US 12,771,276 B2
(45) Date of Patent: Oct. 20, 2026

(54) MOTOR DRIVE CONTROL DEVICE, MOTOR UNIT, AND MOTOR DRIVE CONTROL METHOD

(71) Applicant: MINEBEA MITSUMI Inc., Kitasaku-gun (JP)

(72) Inventors: Hiroyuki Kaidu, Kitasaku-gun (JP); Tomotaka Sakuma, Kitasaku-gun (JP); Masato Aoki, Kitasaku-gun (JP); Tsuyoshi Tabata, Kitasaku-gun (JP)

(73) Assignee: MINEBEA MITSUMI INC., Nagano (JP)

(*) Notice: Subject to any disclaimer, the term of this patent is extended or adjusted under 35 U.S.C. 154(b) by 215 days.

(21) Appl. No.: 18/712,510

(22) PCT Filed: Nov. 1, 2022

(86) PCT No.: PCT/JP2022/040849

§ 371 (c)(1),
(2) Date: May 22, 2024

(87) PCT Pub. No.: WO2023/100580

PCT Pub. Date: Jun. 8, 2023

(65) Prior Publication Data

US 2025/0015746 A1 Jan. 9, 2025

(30) Foreign Application Priority Data

Dec. 1, 2021 (JP) ................................ 2021-195046

(51) Int. Cl.

| | |
|---|---|
| ***H02P 29/032*** | (2016.01) |
| ***H02P 23/14*** | (2006.01) |
| ***H02P 27/06*** | (2006.01) |

(52) U.S. Cl.

CPC ........... *H02P 29/032* (2016.02); *H02P 23/14* (2013.01); *H02P 27/06* (2013.01); *H02P 2205/01* (2013.01); *H02P 2205/07* (2013.01)

(58) Field of Classification Search

CPC ........ H02P 29/032; H02P 23/14; H02P 27/06; H02P 2205/01; H02P 2205/07

(Continued)

(56) References Cited

U.S. PATENT DOCUMENTS

| | | | | |
|---|---|---|---|---|
| 6,400,107 B1 * | 6/2002 | Nakatani | ................. | H02P 6/085 318/400.32 |
| 7,560,893 B2 * | 7/2009 | Thomson | .................. | H02P 8/14 318/400.11 |

(Continued)

FOREIGN PATENT DOCUMENTS

| | | |
|---|---|---|
| JP | S63-249490 A | 10/1988 |
| JP | 2004-166436 A | 6/2004 |

(Continued)

OTHER PUBLICATIONS

International Search Report for corresponding International Application No. PCT/JP2022/040849 mailed Jan. 17, 2023.

(Continued)

*Primary Examiner* — David Luo

(74) *Attorney, Agent, or Firm* — Chrisman Gallo Tochtrop LLC

(57) ABSTRACT

To satisfy a desired air flow-static pressure characteristic while satisfying constraints of a power supply capacity and without over-limiting the drive current. A motor drive control device includes: a control circuit unit configured to generate a drive control signal (Sd) for controlling an actual rotation speed of a motor based on a speed command signal indicating a target rotation speed of the motor; and a motor drive unit configured to drive the motor based on the drive (Continued)

control signal (Sd). The control circuit unit includes a power control unit configured to enable selection of one of: a speed feedback control mode to generate the drive control signal (Sd) so that the actual rotation speed of the motor matches the target rotation speed; and a current feedback control mode to generate the drive control signal (Sd) so that a drive current of the motor matches a target current. The power control unit sets a current threshold corresponding to a power supply voltage (Vdd) supplied from the outside as the target current, and when detecting that the drive current is not less than the current threshold, switches from the speed feedback control mode to the current feedback control mode.

10 Claims, 6 Drawing Sheets

(58) Field of Classification Search
USPC .......................................... 318/400.01, 700
See application file for complete search history.

(56) References Cited

U.S. PATENT DOCUMENTS 11,754,084 B2 * 9/2023 Aoki .................... F04D 27/004 417/410.1
2020/0284266 A1 9/2020 Aoki et al.
2023/0374995 A1 11/2023 Aoki et al.

FOREIGN PATENT DOCUMENTS

JP 2016-158443 A 9/2016
JP 2020-145773 A 9/2020

OTHER PUBLICATIONS

Written Opinion for corresponding International Application No. PCT/JP2022/040849 dated Jan. 17, 2023 and English translation.

* cited by examiner

MOTOR DRIVE CONTROL DEVICE, MOTOR UNIT, AND MOTOR DRIVE CONTROL METHOD

CROSS-REFERENCE TO RELATED APPLICATIONS

This application is a national stage entry of International Application No. PCT/JP2022/040849 filed on Nov. 1, 2022, which claims the benefit of priority to Japanese Application No. 2021-195046, filed Dec. 1, 2021, the entire disclosures of which are hereby incorporated herein by reference.

TECHNICAL FIELD

The present invention relates to a motor drive control device, a motor unit, and a motor drive control method.

BACKGROUND ART

Conventionally, a fan (fan motor) is widely known as a device for cooling components or the like provided inside home electric appliances, office automation equipment, or the like. In general, the performance of a fan is expressed by air flow-static pressure characteristic (hereinafter also called "P-Q characteristic").

The P-Q characteristic represents the relationship between the pressure loss (static pressure) between the suction port and the discharge port of a fan, and the air flow. In the P-Q characteristic, the air flow of a fan is zero when the static pressure is maximum (ventilation resistance is maximum), and the air flow of the fan is maximum when the static pressure is zero (ventilation resistance is zero). Note that, a state of zero static pressure, that is, a state of maximum fan air flow is also referred to as a "free air state".

Recently, in the fan motor, for example, when the current limit value of the host device driving ten motors in the server system is 30 A, constraints of power supply capacity arise such that the current limit value for each motor needs to be set to 3 A.

Under such circumstances, the fan motor may be required to set the current limit according to customer requirements, specifications, and the like, in the air flow range other than the operation point (operation region defined by the air flow and static pressure required by the customer) in the P-Q characteristic.

When the conventional speed feedback control for maintaining the actual rotation speed of the motor constant is performed in the fan motor, the drive current of the motor needs to be increased at the point with high static pressure in the P-Q characteristic, in comparison with the operation point or the free air region (the region with the maximum fan air flow). When the drive current of the motor is increased without limitation, it may damage the motor, the drive circuit of the motor, or the like, so some countermeasures are necessary.

Conventionally, for example, in Patent Document 1, a motor control device is proposed to perform current limiting by detecting an overcurrent with an overcurrent detection circuit using an algorithm for overcurrent protection.

CITATION LIST

Patent Literature

PTL 1: JP 2016-158443 A

SUMMARY OF INVENTION

Technical Problem

However, in the motor control device of Patent Document 1, the peak value of current is used for determining whether the current is an overcurrent as an algorithm for general overcurrent protection, so the variation of the peak value is large depending on the degree of advance angle and individual difference, and the current limit value (current threshold) for determining whether the current is an overcurrent needs to be made smaller in advance than the user requirements.

In such a case, the drive current of the motor is sometimes excessively limited, thereby the drive current is also limited at the operation point, and the desired P-Q characteristic may not be satisfied.

An object of the present invention is to provide a motor drive control device, a motor unit, and a motor drive control method capable of satisfying the desired air flow-static pressure characteristic without excessively limiting the drive current of the motor while satisfying constraints of power supply capacity.

Solution to Problem

A motor drive control device according to a representative embodiment of the present invention includes:

- a control circuit unit configured to generate a drive control signal for controlling an actual rotation speed of a motor based on a speed command signal indicating a target rotation speed of the motor; and
- a motor drive unit configured to drive the motor based on the drive control signal.

The control circuit unit includes a power control unit configured to enable selection of one of:

- a speed feedback control mode to generate the drive control signal so that the actual rotation speed of the motor matches the target rotation speed; and
- a current feedback control mode to generate the drive control signal so that a drive current of the motor matches a target current.

The power control unit sets a current threshold corresponding to a power supply voltage supplied from the outside as the target current, and when detecting the drive current being not less than the current threshold, switches from the speed feedback control mode to the current feedback control mode.

One aspect of the present invention allows to realize a motor drive control device, a motor unit, and a motor drive control method to satisfy a desired air flow-static pressure characteristic without over-limiting the motor drive current while satisfying constraints of a power supply capacity.

DESCRIPTION OF EMBODIMENTS

Embodiments of Present Invention

Embodiments of the present invention will be described below with reference to the drawings. In the following description, the same reference signs will be used for the common components in each embodiment, and repeated descriptions will be omitted.

Figure 1:
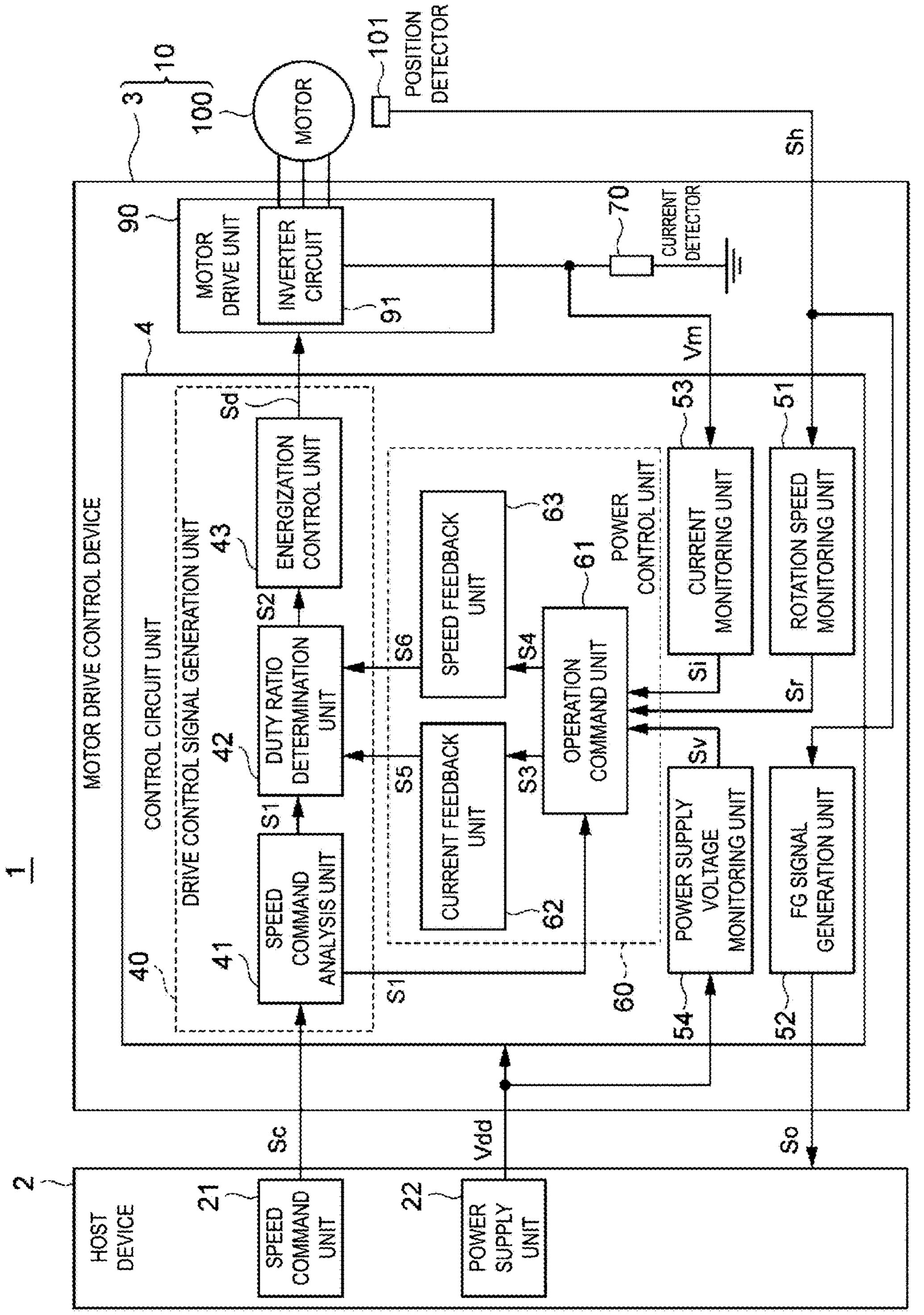
FIG. 1 is a diagram illustrating an example of a configuration of a fan system according to a present embodiment.

FIG. 1 is a diagram illustrating an example of a configuration of a fan system 1 according to an embodiment of the present invention. The fan system 1 illustrated in FIG. 1 includes a host device 2 and a motor unit 10. A motor drive control device 3 of the motor unit 10 is a device for controlling the drive of a motor 100 as a driven object.

The motor 100 is, for example, a three-phase brushless motor. Note that the type of motor 100 is not particularly limited, and the number of phases is not limited to three-phase. For example, an impeller (vane wheel) (not illustrated) is connected to an output shaft of the motor 100. The impeller (not illustrated) is a component for generating wind and is rotatable by the rotational force of the motor 100. For example, the rotation axis of the impeller is coaxially connected to the output shaft of the motor 100.

In the embodiment of the present invention, for example, the impeller and the motor 100 constitute one fan (fan motor). The motor 100 and the motor drive control device 3 constitute one motor unit 10.

In this case, the motor unit 10 is assumed to be arranged in a closed space in a server, for example, and constitutes a cooling system for cooling various electronic components, or the like, constituting the server, by an impeller (not illustrated) connected to the motor 100. The motor unit 10 (motor drive control device 3 and motor 100) operates based on various commands from the host device 2.

The motor drive control device 3 rotates the motor 100 by periodically flowing the drive current through the three-phase coils constituting the motor 100. The motor drive control device 3 includes a control circuit unit 4, a current detector 70, and a motor drive unit 90. The components of the motor drive control device 3 illustrated in FIG. 1 are a part of the whole. The motor drive control device 3 may include other components in addition to the components illustrated in FIG. 1.

The motor drive unit 90 outputs a drive signal generated based on a drive control signal Sd output from the control circuit unit 4 of the motor drive control device 3 to the motor 100 to drive the motor 100. The motor drive unit 90 selectively energizes the three-phase coils in the motor 100.

Specifically, the motor drive unit 90 includes an inverter circuit 91 and a pre-drive circuit (not illustrated). The pre-drive circuit generates an output signal for driving the inverter circuit 91 based on the drive control signal Sd output from the control circuit unit 4, and outputs the output signal to the inverter circuit 91. The inverter circuit 91 generates and outputs a drive signal based on the output signal from the pre-drive circuit to energize the three-phase coils provided in the motor 100.

The current detector 70 is a function unit for detecting the drive current flowing to the motor 100, that is, the drive current flowing to each coil of the motor 100. The current detector 70 outputs a voltage Vm corresponding to the drive current of the motor 100 to the control circuit unit 4.

The current detector 70 includes a resistor (not illustrated) connected in series between each coil of the motor 100 and the ground potential via the motor drive unit 90, and outputs the voltage Vm generated at both ends of the resistor as drive current (detected current) flowing through each coil of the motor 100.

The host device 2 is a control device for controlling the motor drive control device 3. For example, when the motor unit 10 (motor drive control device 3 and motor 100) constitutes a cooling system for the server, the host device 2 is a program processing device for achieving the main function as the server.

For example, the host device 2 is realized by accommodating a program processing apparatus (e.g., a microcontroller) together with the motor unit 10 in one housing. In the configuration of the program processing device, a processor such as a CPU (Central Processing Unit), various storage devices such as a RAM (Random Access Memory), a ROM (Read Only Memory), and peripheral circuits such as a counter (timer), an A/D (Analog-Digital) conversion circuit, a D/A (Digital-Analog) conversion circuit, a clock generation circuit, and an input/output I/F (Interface) circuit, are connected to each other via a bus or a dedicated line.

The host device 2 controls the rotation of the motor 100 so that the air flow of the impeller (not illustrated) is appropriate in response to an environmental change (such as a change in the processing load or in the temperature inside the server).

As illustrated in FIG. 1, the host device 2 includes a speed command unit 21 and a power supply unit 22. The speed command unit 21 transmits, to the motor drive control device 3 of the motor unit 10, a speed command signal Sc indicating the target rotation speed (hereinafter referred to as "target rotation speed") Rtg of the motor 100. The power supply unit 22 supplies a power supply voltage Vdd for driving the control circuit unit 4.

The speed command unit 21 is realized, for example, in the program processing device constituting the host device 2, by the processor executing various arithmetic operations according to a program stored in a memory and controlling peripheral circuits such as counters and A/D conversion circuits.

The speed command unit 21 monitors the rotation state of the motor 100 using the motor drive control device 3 by receiving a rotation speed signal So (e.g., FG (Frequency Generator) signal) representing the actual rotation speed (hereinafter referred to as "actual rotation speed") Rmv of the motor 100 output from the control circuit unit 4 of the motor drive control device 3 via a communication unit (not illustrated). The transmission/reception of the rotation speed signal So may be realized by using, for example, a dedicated line connecting the host device 2 and the motor drive control device 3, or by serial communication.

The motor drive control device 3 has, as its main functions, a motor drive control function for controlling the rotation of the motor 100, a communication function for communicating with the host device 2, and a monitoring function for monitoring the operating state of the motor 100.

Specifically, as the motor drive control function, the motor drive control device 3 generates the drive control signal Sd by a drive control signal generation unit 40 of the control circuit unit 4 corresponding to the speed command signal Sc from the host device 2, and outputs the drive control signal Sd to the motor 100 via the motor drive unit 90.

As a result, the motor drive control device 3 outputs the drive signal corresponding to the drive control signal Sd to the motor 100 by the motor drive unit 90, and periodically flows the drive current to the coil of each phase of the motor 100 to rotate the motor 100.

As a communication function, the motor drive control device 3 transmits and receives various commands (speed command signal Sc, or the like) to and from the host device 2 by transmitting and receiving data to and from the host device 2, and transmits responses or the like for the received commands to the host device 2.

As a monitoring function, the motor drive control device 3 monitors the operating state of the motor 100 by measuring the physical quantity related to the operation of the motor 100 to be driven, and controls the fan by the motor 100 to satisfy the desired air flow-static pressure characteristic (P-Q characteristic) based on the measurement result.

The physical quantity related to the operating state of the motor 100 include, for example, the drive current (coil current), the actual rotation speed, the driving voltage (coil voltage), the ambient temperature, or the like, of the motor 100. In the present embodiment, in particular, the drive current (coil current) of the motor 100 and the actual rotation speed Rmv of the motor 100 are mainly used.

The motor drive control device 3 includes the control circuit unit 4 as a function unit for achieving the aforementioned functions. The control circuit unit 4 includes, for example, the drive control signal generation unit 40, a power control unit 60, a rotation speed monitoring unit 51, an FG signal generation unit 52, a current monitoring unit 53, and a power supply voltage monitoring unit 54.

Among the function units of the control circuit unit 4, the drive control signal generation unit 40, the power control unit 60, the rotation speed monitoring unit 51, the FG signal generation unit 52, the current monitoring unit 53, and the power supply voltage monitoring unit 54 are realized by, for example, a program processing device. Specifically, a program processing device (e.g., a microcontroller) has a configuration such that a processor such as a CPU, various storage devices such as RAM and ROM, and peripheral circuits such as a counter (timer), an A/D conversion circuit, a D/A conversion circuit, a clock generation circuit, and an input/output I/F circuit are connected to each other via a bus or a dedicated line. In the program processing device, the CPU executes various arithmetic operations according to programs stored in the memory, and controls peripheral circuits such as an A/D conversion circuit and an input/output interface circuit based on the processing results, thereby realizing the aforementioned function blocks.

Note that the motor drive control device 3 may have a configuration such that the control circuit unit 4, the motor drive unit 90, and at least a part of the other function units are packaged as one integrated circuit device (IC), or alternatively, the control circuit unit 4, the motor drive unit 90, and the other function units are packaged as individual integrated circuit devices.

Hereinafter, the respective function units constituting the control circuit unit 4 of the motor drive control device 3 will be described in detail below.

The drive control signal generation unit 40 is a function unit configured to generate the drive control signal Sd for controlling the drive of the motor 100. For example, when the speed command signal Sc output from the host device 2 is received, the drive control signal generation unit 40 generates the drive control signal Sd so that the actual rotation speed Rmv of the motor 100 matches a target rotation speed Rtg specified by the speed command signal Sc. Here, the drive control signal Sd is, for example, a PWM (Pulse Width Modulation) signal.

The drive control signal generation unit 40 includes a speed command analysis unit 41, a duty ratio determination unit 42, and an energization control unit 43.

The speed command analysis unit 41 receives the speed command signal Sc output from the speed command unit 21 of the host device 2 and analyzes the target rotation speed Rtg specified by the speed command signal Sc. For example, when the speed command signal Sc is a PWM signal having a duty ratio corresponding to the target rotation speed Rtg, the speed command analysis unit 41 analyzes the duty ratio of the speed command signal Sc and outputs the information of the rotation speed corresponding to the duty ratio as a target rotation speed information S1.

The duty ratio determination unit 42 determines the duty ratio of the PWM signal as the drive control signal Sd based on the target rotation speed information S1 output from the speed command analysis unit 41, and current feedback instruction information S5 or speed feedback instruction information S6 supplied from the power control unit 60 described below, and outputs duty ratio information S2 to the energization control unit 43.

The energization control unit 43 generates a PWM signal corresponding to the duty ratio information S2 determined by the duty ratio determination unit 42, and outputs the PWM signal to the motor drive unit 90 as the drive control signal Sd.

The motor drive unit 90 drives the motor 100 based on the drive control signal Sd generated by the drive control signal generation unit 40. The inverter circuit 91 of the motor drive unit 90 outputs a drive signal to the motor 100 based on the output signal output from the pre-drive circuit described above, and energizes the coils of the motor 100.

The rotation speed monitoring unit 51 is a function unit measuring the actual rotation speed Rmv of the motor 100. The rotation speed monitoring unit 51 measures, for example, an actual rotation speed Rmv of the motor 100 based on a position detection signal Sh of the Hall element as a position detector 101 disposed in the vicinity of the motor 100, and outputs the measurement result to an operation command unit 61 of the power control unit 60 as rotation speed information Sr of the motor 100. Here, the position detection signal Sh is a Hall signal output from the Hall element as the position detector 101 and is a signal indicating the rotation position of the motor 100, that is, a signal corresponding to the rotation of the motor 100.

The FG signal generation unit 52 generates an FG signal as the rotation speed signal So indicating the actual rotation speed Rmv of the motor 100. The FG signal generation unit 52 generates a signal (FG signal) having a period (frequency) proportional to the actual rotation speed Rmv of the motor 100 based on the position detection signal (Hall signal) Sh output from the position detector 101 (Hall element).

The FG signal output from the FG signal generation unit 52 is input to the host device 2 as the rotation speed signal So.

The current monitoring unit 53 receives the voltage Vm detected by the current detector 70 as the detected current, calculates the measured value (hereinafter simply referred to as "measured current value") of the drive current flowing to the motor 100 based on the voltage Vm, and outputs the measured current value to the operation command unit 61 of the power control unit 60 as drive current information Si.

Specifically, the current monitoring unit 53 smooths the voltage Vm detected by the current detector 70 to obtain a smoothed current of the motor 100. Furthermore, the current monitoring unit 53 includes a ΔΣADC (ΔΣ modulation type analog/digital conversion circuit) for AD converting the detected current or the smoothed current. For example, the current monitoring unit 53 converts the detected current based on the voltage Vm (analog signal) input from the current detector 70 into a digital signal by the ΔΣ modulation method, thereby calculates the measured current value being the average of the values obtained by integrating the detected current with time. The current monitoring unit 53 outputs the calculated measured current value as drive current information Si to the operation command unit 61 of the power control unit 60. In the case of the ΔΣADC, either the detected current or the smoothed current can be converted, but for example, in the case of using the SAR (Successive Approximation Register) type ADC, the smoothed current is converted.

The power supply voltage monitoring unit 54 monitors the voltage value of the power supply voltage Vdd supplied from the power supply unit 22 of the host device 2 to the motor drive control device 3, and outputs the voltage value as power supply voltage information Sv to the operation command unit 61 of the power control unit 60.

The power control unit 60 includes the operation command unit 61, a current feedback unit 62, and a speed feedback unit 63.

The operation command unit 61 is a function unit configured to receive the target rotation speed information S1 from the speed command analysis unit 41, the rotation speed information Sr from the rotation speed monitoring unit 51, the drive current information Si from the current monitoring unit 53, and the power supply voltage information Sv from the power supply voltage monitoring unit 54, and configured to determine, based on such information, whether the motor 100 is controlled by the speed feedback control mode (hereinafter, also referred to as "speed FB control mode"), or by the current feedback control mode (hereinafter, also referred to as "current FB control mode").

The speed feedback control mode is a mode to generate the drive control signal Sd so that the actual rotation speed Rmv of the motor 100 matches the target rotation speed Rtg. On the other hand, the current feedback control mode is a mode to generate the drive control signal Sd so that the drive current of the motor 100 matches the target current. Specifically, this is a mode to drive the motor 100 so that the measured current value (drive current information Si) of the motor 100 matches a current threshold Sth (e.g., 5.0 A) as a target current.

The operation command unit 61 constantly monitors the drive current information Si from the current monitoring unit 53, and determines whether the measured current value of the motor 100 is less than a predetermined current threshold Sth or not less than the current threshold Sth based on the drive current information Si. Here, the current threshold Sth is a threshold value set by the operation command unit 61 according to the voltage value of the power supply voltage Vdd indicated by the power supply voltage information Sv from the power supply voltage monitoring unit 54. That is, the operation command unit 61 changes the current threshold Sth according to the value of the power supply voltage Vdd so that the power of the motor 100 becomes a desired value.

For example, when the motor 100 is constrained so as to be driven at 60 W of power, the operation command unit 61 sets the current threshold Sth to 5.0 A when the voltage value of the power supply voltage Vdd is 12 V, and sets the current threshold Sth to 6.0 A when the voltage value of the power supply voltage Vdd is 10 V. In other words, the current feedback control mode can be referred to as a power feedback control mode. Hereinafter, as a specific example, the current threshold Sth will be described as 5.0 A.

The operation command unit 61 compares the drive current information Si (measured current value) from the current monitoring unit 53 with the current threshold Sth, and when the drive current information Si (measured current value) is less than the current threshold Sth (Si<Sth), generates the operation command information S4 for controlling the driving of the motor 100 by the speed feedback control mode, and outputs operation command information S4 to the speed feedback unit 63.

Specifically, the operation command unit 61 compares the target rotation speed Rtg calculated based on the target rotation speed information S1 input from the speed command analysis unit 41 with the actual rotation speed Rmv of the motor 100 calculated based on the rotation speed information Sr input from the rotation speed monitoring unit 51, and outputs, to the speed feedback unit 63, the operation command information S4 instructing the actual rotation speed Rmv of the motor 100 to match the target rotation speed Rtg.

On the other hand, the operation command unit 61 compares the drive current information Si (measured current value) with the current threshold Sth, and as a result, when the drive current information Si (measured current value) is not less than the current threshold Sth (Si≥Sth), generates operation command information S3 for controlling the driving of the motor 100 by the current feedback control mode, and outputs the operation command information S3 to the current feedback unit 62.

The speed feedback unit 63, when receiving the operation command information S4 from the operation command unit 61, generates the speed feedback instruction information S6 based on the operation command information S4, and outputs the speed feedback instruction information S6 to the duty ratio determination unit 42 of the drive control signal generation unit 40.

On the other hand, the current feedback unit 62, when receiving the operation command information S3 from the operation command unit 61, generates the current feedback instruction information S5 based on the operation command information S3, and outputs the current feedback instruction information S5 to the duty ratio determination unit 42 of the drive control signal generation unit 40.

The operation command unit 61 outputs either the operation command information S3 or the operation command information S4 based on the comparison result between the drive current information Si (measured current value) and the current threshold Sth, so that only one of the current feedback instruction information S5 or the speed feedback instruction information S6 is output to the duty ratio determination unit 42 from the power control unit 60.

Note that the operation command unit 61 outputs the operation command information S3 to execute the current feedback control mode or the operation command information S4 to execute the speed feedback control mode in the whole air flow range determined by the P-Q characteristic. Here, the whole air flow range determined by the P-Q characteristic is a range of the air flow from minimum (maximum pressure) to maximum (minimum pressure).

As described above, the power control unit 60 can select either a speed feedback control mode to generate the drive control signal Sd so that the actual rotation speed Rmv of the motor 100 matches the target rotation speed Rtg, or a current feedback control mode to generate the drive control signal Sd so that the measured current value being the drive current of the motor 100 matches the target current.

The power control unit 60 sets the current threshold Sth set according to the power supply voltage Vdd supplied from the outside (in the present embodiment, host device 2) as the target current, and switches from the speed feedback control mode to the current feedback control mode when detecting the drive current (measured current value) being not less than the current threshold Sth.

In the present invention, considering the control, by the power control unit 60, of the drive current of the motor 100 based on the current threshold Sth set according to the voltage value of the power supply voltage Vdd indicated by the power supply voltage information Sv from the power supply voltage monitoring unit 54, the control by the power control unit 60 is collectively referred to as “power control”.

The duty ratio determination unit 42 determines the duty ratio of the PWM signal as the drive control signal Sd based on the target rotation speed information S1 output from the speed command analysis unit 41, and the current feedback instruction information S5 input from the current feedback unit 62 or the speed feedback instruction information S6 input from the speed feedback unit 63.

Specifically, the duty ratio determination unit 42, when receiving the current feedback instruction information S5, determines the duty ratio information S2 based on the current feedback instruction information S5 so that the measured current value of the motor 100 matches the current threshold Sth of 5.0 A.

The duty ratio determination unit 42, when receiving the speed feedback instruction information S6, determines the duty ratio information S2 based on the speed feedback instruction information S6 so that the actual rotation speed Rmv of the motor 100 matches the target rotation speed information S1 (target rotation speed Rtg) from the speed command analysis unit 41.

Next, the drive control processing procedure of the motor 100 by the power control unit 60 will be described.

Figure 2:
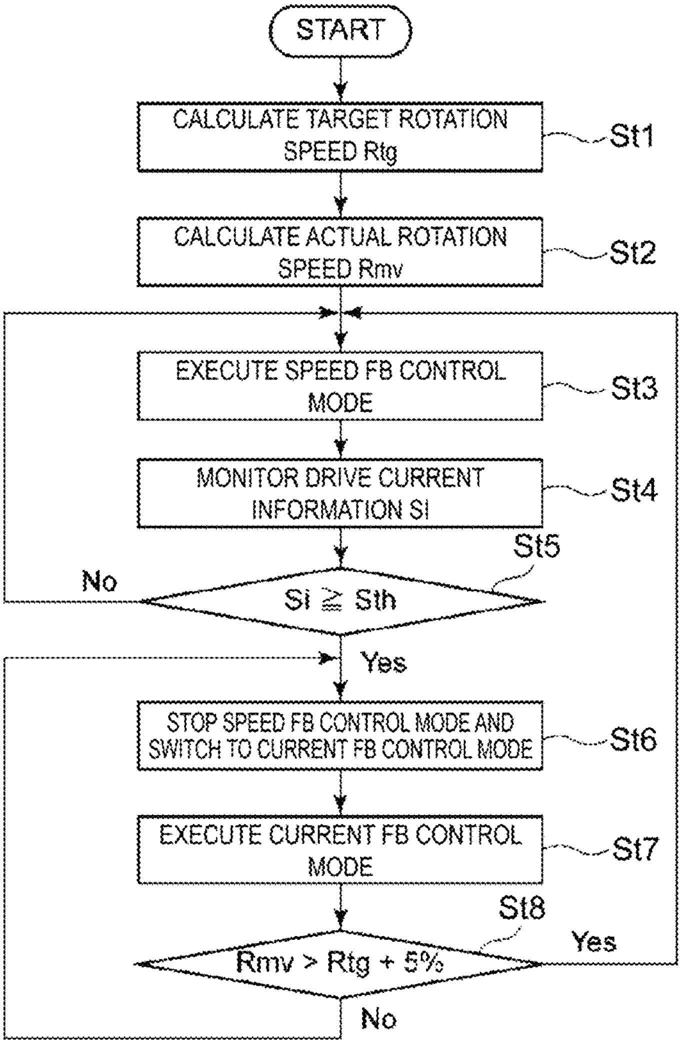
FIG. 2 is a flowchart illustrating an example of a flow of motor drive control processing based on an operation of a power control unit in a motor drive control device of a fan system according to the present embodiment.

FIG. 2 is a flowchart illustrating an example of the flow of the motor drive control processing based on the operation of the power control unit 60 in the motor drive control device 3 of the fan system 1 according to the present embodiment.

The operation command unit 61 of the power control unit 60 calculates the target rotation speed Rtg (rpm) based on the target rotation speed information S1 input from the speed command analysis unit 41 (step St1). Next, the operation command unit 61 calculates the actual rotation speed Rmv (rpm) of the motor 100 being driven based on the rotation speed information Sr input from the rotation speed monitoring unit 51, immediately after the motor 100 starts driving (step St2).

Immediately after the motor 100 starts driving, the operation command unit 61 outputs, to the speed feedback unit 63, the operation command information S4 instructing so that the actual rotation speed Rmv of the motor 100 matches the target rotation speed Rtg, and executes the speed feedback control mode (steps St3). The motor drive control device 3 controls the driving so that the actual rotation speed Rmv of the motor 100 matches the target rotation speed Rtg while executing the speed feedback control mode.

Specifically, the speed feedback unit 63 generates the speed feedback instruction information S6 including the actual rotation speed Rmv of the motor 100 in response to the operation command information S4 received from the operation command unit 61 and outputs the speed feedback instruction information S6 to the duty ratio determination unit 42 of the drive control signal generation unit 40. The duty ratio determination unit 42 calculates the difference between the actual rotation speed Rmv and the target rotation speed Rtg of the motor 100 based on the speed feedback instruction information S6 received from the speed feedback unit 63, determines the duty ratio of the PWM signal as the drive control signal Sd so that the difference becomes 0, and outputs the determined duty ratio information S2 to the energization control unit 43. The energization control unit 43 generates the drive control signal Sd based on the duty ratio information S2 to drive the motor 100 so that the actual rotation speed Rmv of the motor 100 matches the target rotation speed Rtg.

The operation command unit 61, while executing the speed feedback control mode, monitors the drive current information Si being the measured current value corresponding to the detected current (voltage Vm) detected by the current detector 70 (step St4). The speed feedback control mode attempts to match the actual rotation speed Rmv of the motor 100 with the target rotation speed Rtg, so that the drive current of the motor 100 increases when the load on the motor 100 increases for some reason.

At this time, the current monitoring unit 53 calculates, for example, the measured current value of the motor 100 by the ΔΣADC, and calculates the drive current information Si. Here, the drive current information Si is specifically an integral value of the detected current (voltage Vm) over a certain period, and is not a peak value of the momentary drive current at a certain time point.

The operation command unit 61 compares the measured current value (drive current information Si) calculated by the current monitoring unit 53 with the current threshold Sth set according to the voltage value of power supply voltage Vdd, and determines whether the measured current value (drive current information Si) is not less than the current threshold Sth (step St5).

When the measured current value (drive current information Si) is less than the current threshold Sth (step St5: NO), the operation command unit 61 returns to step St3 and controls the driving so that the actual rotation speed Rmv of the motor 100 matches the target rotation speed Rtg while remaining in the speed feedback control mode. In this case, the measured current value (drive current information Si) is less than the current threshold Sth, so the load on the motor 100 has not increased, and the drive current of the motor 100 has not increased.

On the other hand, when the measured current value (drive current information Si) is not less than the current threshold Sth (step St5: YES), the operation command unit 61 stops the speed feedback control mode and switches from the speed feedback control mode to the current feedback control mode (step St6).

The measured current value (drive current information Si) is not less than the current threshold Sth because a large amount of drive current is required when the load on the motor 100 increases for some reason, even though the actual rotation speed Rmv of the motor 100 is trying to match the target rotation speed Rtg in the speed feedback control mode.

Specifically, the operation command unit 61 stops the output of the operation command information S4 to the speed feedback unit 63 and outputs the operation command information S3 to the current feedback unit 62 to execute the current feedback control mode. The current feedback unit 62 generates the current feedback instruction information S5 in response to the operation command information S3 received from the operation command unit 61 and outputs the current feedback instruction information S5 to the duty ratio determination unit 42 of the drive control signal generation unit 40. Based on the current feedback instruction information S5 received from the current feedback unit 62, the duty ratio determination unit 42 determines the duty ratio information S2 so that the measured current value (drive current information Si) matches the current threshold Sth of 5.0 A and outputs the duty ratio information S2 to the energization control unit 43. The energization control unit 43 drives the motor 100 so that the measured current value (drive current information Si) matches the current threshold Sth of 5.0 A, by outputting the drive control signal Sd generated based on the duty ratio information S2 via the motor drive unit 90.

Next, the change of the drive current by the speed feedback control using the conventional overcurrent protection and the change of the drive current by the power control according to the present embodiment will be described.

Figure 3:
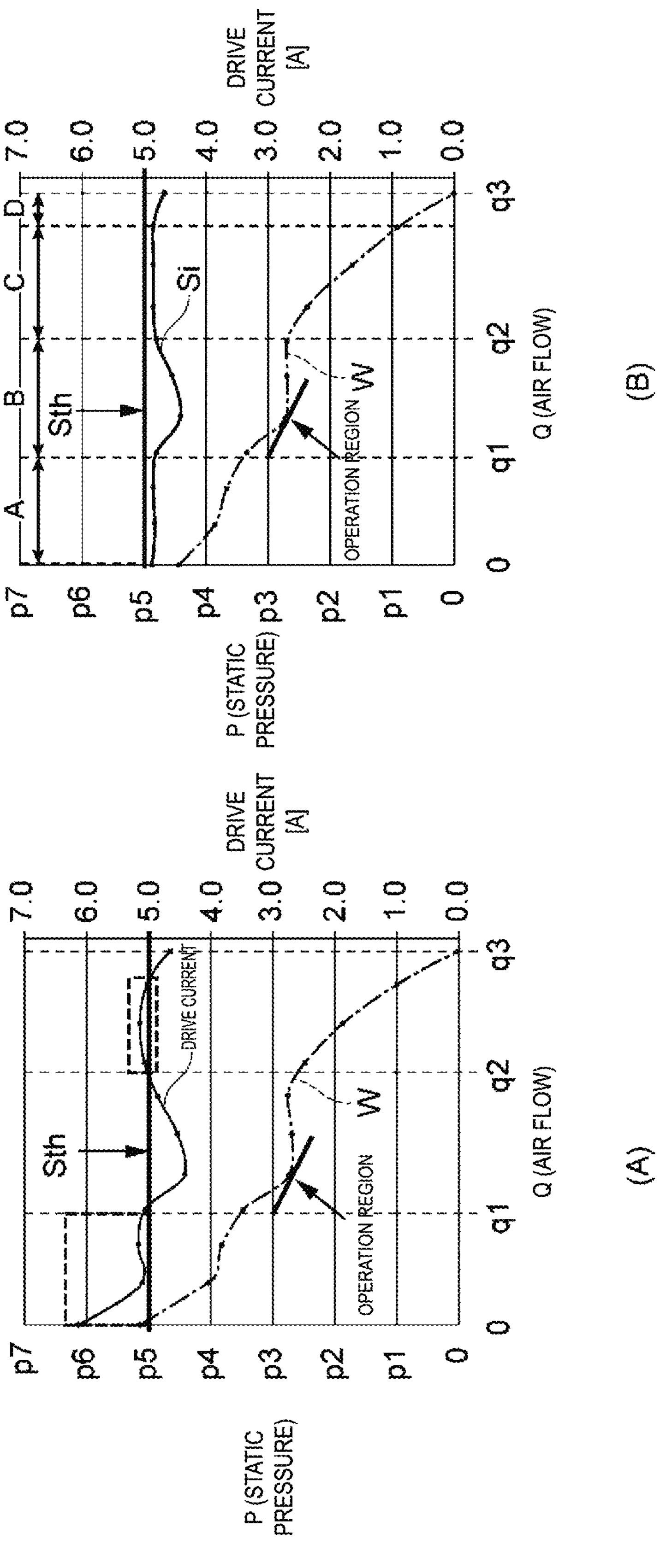
FIG. 3 is a diagram illustrating an example of a change (A) in drive current due to speed feedback control using conventional overcurrent protection and a change (B) in drive current due to power control according to the present embodiment.

FIG. 3(A) is a diagram illustrating an example of the change of the drive current in the speed feedback control by the conventional overcurrent protection, and FIG. 3(B) is a diagram illustrating an example of the change of the drive current by the power control according to the present embodiment. In both drawings, the curve indicated by W indicates the required air flow-static pressure characteristic (P-Q characteristic).

As illustrated in FIG. 3(A), when only the speed feedback control using the conventional overcurrent protection is performed, the load on the motor 100 increases in the two air flow regions (a region with air flow between 0 and q1, and a region between q2 and q3) enclosed by the broken lines, and even when the drive current needs to be limited to 5.0 A, the drive current of the motor 100 increases and exceed the current threshold Sth of 5.0 A.

To avoid such a situation, the operation command unit 61 of the power control unit 60 according to the present embodiment instructs switching from the speed feedback control mode to the current feedback control mode. The operation command unit 61 controls the drive current of the motor 100 so that the measured current value (drive current information Si) matches the current threshold Sth, thereby executing the current feedback control mode (step St7).

As illustrated in FIG. 3(B), the motor drive control device 3 can control so that the measured current value (drive current information Si) does not exceed the current threshold Sth of 5.0 A in the whole air flow range (0 to q3 region) defined by the P-Q characteristic.

In particular, as illustrated in FIG. 3(B), the measured current value (drive current information Si) does not exceed the current threshold Sth of 5.0 A not only in the speed feedback control mode executed in a region B and a region D but also in the current feedback control mode executed in a region A and a region C. Thus, the motor drive control device 3 can prevent the motor 100, the motor drive unit 90, or the like from being damaged by the increase in the drive current.

Thus, the motor drive control device 3 controls the measured current value (drive current information Si) to match the current threshold Sth of 5.0 A in the current feedback control mode, so the drive current is not limited more than necessary in anticipation of the risk of damage to the motor 100, or the like, and also a desired air flow-static pressure characteristic (P-Q characteristic) exceeding the air flow-static pressure characteristic (P-Q characteristic) W required in the operation region can be obtained.

During execution of the current feedback control mode (step St7), the operation command unit 61 determines whether the actual rotation speed Rmv of the motor 100 exceeds a predetermined ratio (X %) with respect to the target rotation speed Rtg (denoted as "Rmv>Rtg+X (%)"). For example, when the target rotation speed Rtg is 16800 rpm and X=5%, if the actual rotation speed Rmv of the motor 100 exceeds 17640 rpm, the load on the motor 100 has been reduced, and the drive current can be reduced from the drive current at present. Thus, the operation command unit 61 can return to step St3 and return from the current feedback control mode to the speed feedback control mode (step St3).

In the present embodiment, when the current feedback control mode is returned to the speed feedback control mode, whether the actual rotation speed Rmv of the motor 100 exceeds by a predetermined ratio (X %) with respect to the target rotation speed Rtg is used as a judgment criterion, but not limited to this, and whether the actual rotation speed Rmv of the motor 100 exceeds a predetermined value (Y rpm) with respect to the target rotation speed Rtg (whether "Rmv>Rtg+Y") may be used as the judgment criterion. The possible values of X and Y can be freely set. That is, whether the actual rotation speed Rmv of the motor 100 falls within a predetermined range of the target rotation speed Rtg is used as the criterion.

Here, when the actual rotation speed Rmv of the motor 100 exceeds the target rotation speed Rtg+X %, this is considered to be because the measured current value (drive current information Si) obtained by smoothing the detected current in the current feedback control mode is less than the current threshold Sth. Thus, the operation command unit 61 switches from the current feedback control mode to the speed feedback control mode.

After that, the operation command unit 61 repeats the processing of steps St3 to St8 to control the driving of the motor 100 while switching between the speed feedback control mode and the current feedback control mode.

Next, the difference between the current limit function by the conventional overcurrent protection and the current limit function by the current feedback control mode according to the present embodiment will be described.

Figure 4:
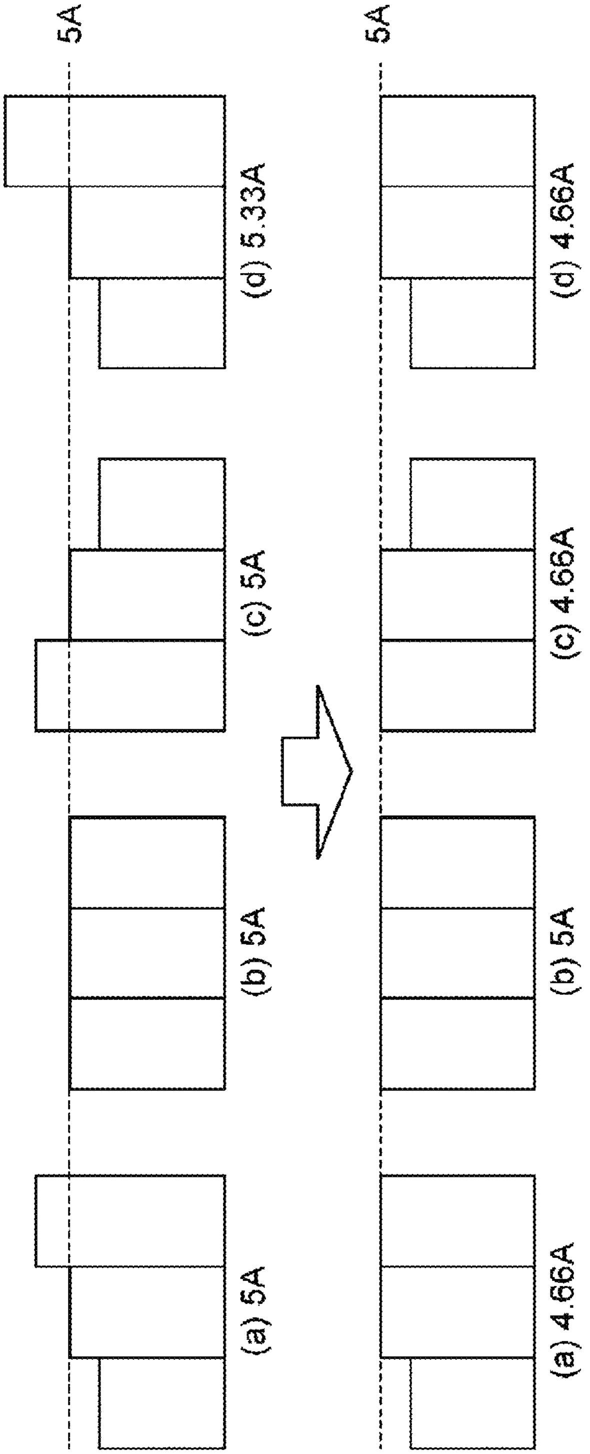
FIG. 4 is a diagram illustrating an example of the limitation of a drive current value due to conventional overcurrent protection.
Figure 5:
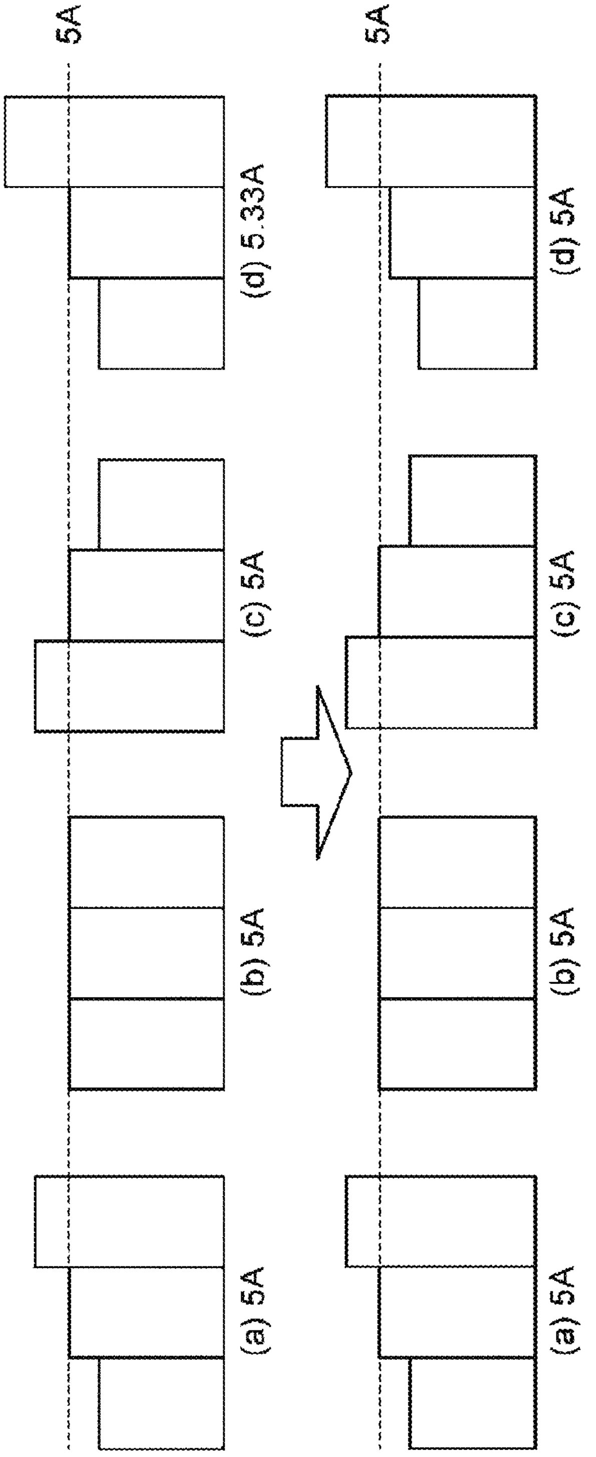
FIG. 5 is a diagram illustrating an example of the limitation of a drive current value in the current feedback control mode according to the present embodiment.

FIG. 4 is a diagram illustrating an example of the limitation of the drive current by the conventional overcurrent protection. FIG. 5 is a diagram illustrating an example of the limitation of the drive current in the current feedback control mode according to the present embodiment. In FIG. 4, the upper row indicates a current waveform of the detected current and the values of the motor drive current (current actually flowing) before the limitation, and the lower row indicates a current waveform of the detected current and the values of the motor drive current (current actually flowing) after the limitation. In FIG. 5, the upper row indicates a current waveform of the detected current and the measured current value (current actually flowing) before the limitation, and the lower row indicates a current waveform of the detected current and the measured current value (current actually flowing) after the limitation. (a) to (d) of respective FIGS. 4 and 5 illustrate example patterns of current waveforms.

As illustrated in FIG. 4, in a conventional motor drive control device, by overcurrent protection, when a state of an overcurrent exceeding the current threshold is detected by using a peak value of current, the peak current value exceeds 5.0 A at a certain timing in (a), (c), and (d), so the drive current is temporarily stopped until the peak current value drops to 5.0 A or less at that time.

For example, in the case of FIG. 4(*a*), even when the average value of the drive current is 5.0 A, the drive current is temporarily stopped because the detected current (peak value) exceeds 5.0 A at a certain timing. Thus, the effective value of the drive current becomes 4.66 A. As a result, the air flow-static pressure characteristic (P-Q characteristic) originally required cannot be obtained.

In the case of FIG. 4(*b*), the detected current (peak value) does not exceed 5.0 A, thereby the drive current is not stopped, and the effective value of the drive current remains at 5.0 A. However, in the cases of FIGS. 4(*c*) and 4(*d*), the detected current (peak value) exceeds 5.0 A at a certain timing, so the drive current is stopped. Thus, as in FIG. 4(*a*), the effective value of the drive current becomes 4.66 A. That is, in the current limit by the conventional overcurrent protection, the effective value of the drive current falls below the desired value, and therefore the P-Q characteristic originally required cannot be obtained.

On the other hand, in the motor drive control device 3 according to the present embodiment, as an example, the current monitoring unit 53 calculates the measured current value (drive current information Si) of the digital value by integrating the voltage Vm (analog signal) corresponding to the detected current with the ΔΣADC over time.

As illustrated in FIGS. 5(*a*) and 5(*c*), even when the detected current (peak value) exceeds 5.0 A at a certain timing, with the measured current value less than 5.0 A, the drive current is supplied without reducing the drive current. This enables the motor drive control device 3 to maintain the P-Q characteristic of the motor 100 originally required, as illustrated in FIG. 3(B).

Further, as illustrated in FIG. 5(*b*), when the drive current is less than 5.0 A at all time points, the measured current value being the average value of the drive current is less than the current threshold Sth, so the drive current is also supplied without reducing the drive current.

On the other hand, as illustrated in FIG. 5(*d*), even when the detected current (peak value) exceeds 5.0 A at a certain timing and the measured current value exceeds the current threshold Sth, such as 5.33 A, the drive current is reduced so that the measured current value matches the current threshold Sth (5.0 A) instead of stopping the drive current. Thus, the motor drive control device 3 can suppress the drive current so as not to exceed the current threshold Sth in accordance with customer requirements or specifications.

That is, the motor drive control device 3 according to the present embodiment can supply the controlled drive current controlled so that the drive current matches the current threshold Sth of 5.0 A, even when the momentary detected current (peak value) exceeds 5.0 A.

Figure 6:
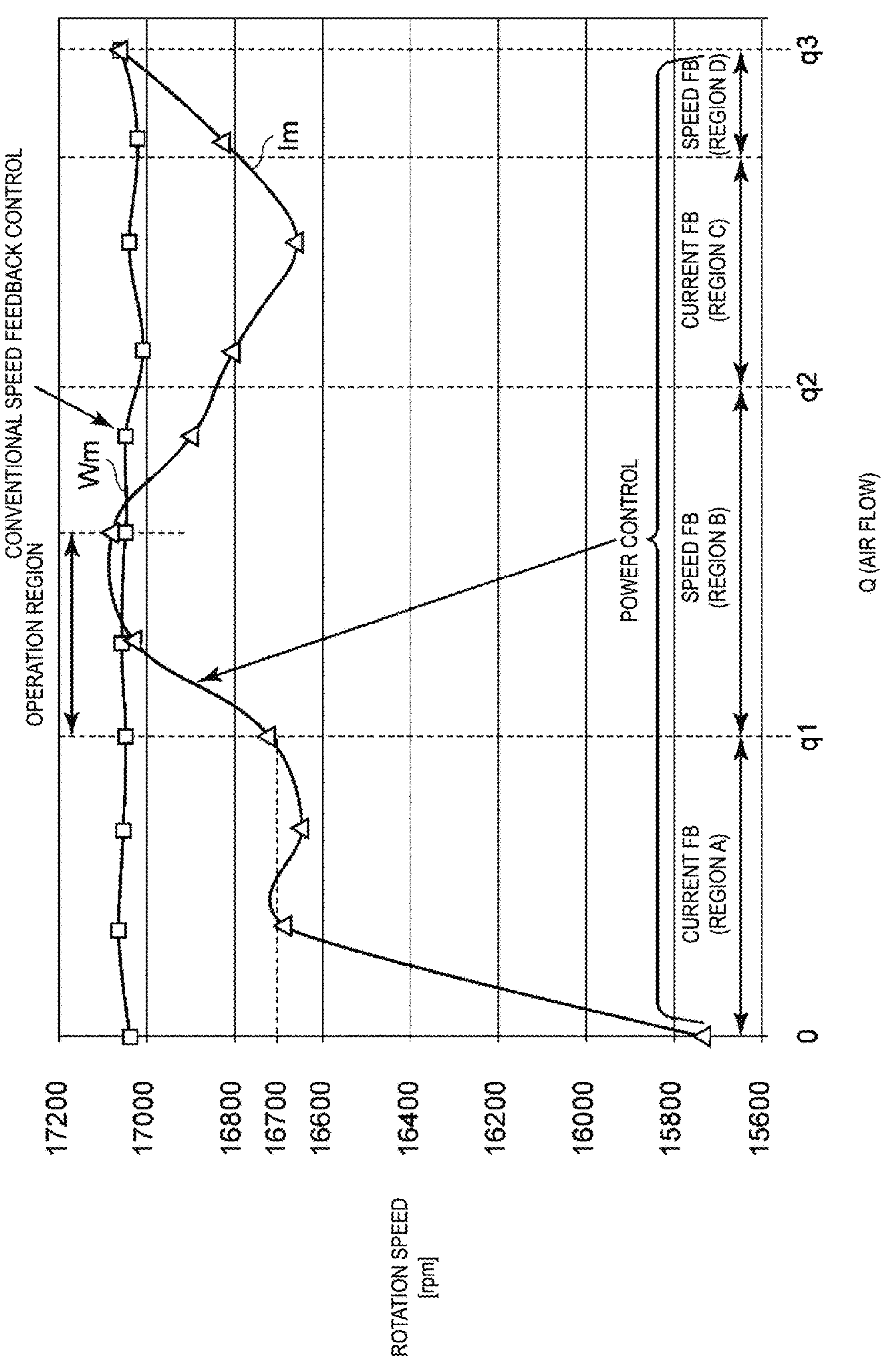
FIG. 6 is a diagram illustrating a comparative example of a change in the actual rotation speed of the motor with respect to the air flow in each of the conventional speed feedback control, and the power control according to the present embodiment.

FIG. 6 is a diagram illustrating a comparative example of a change of the actual rotation speed of the motor with respect to the air flow in the conventional speed feedback control and the power control according to the present embodiment. Specifically, a waveform Wm indicates the change of the actual rotation speed of the motor with respect to the air flow in the conventional speed feedback control, and a waveform Im indicates the change of the actual rotation speed Rmv of the motor with respect to the air flow in the power control according to the present embodiment.

As illustrated in FIG. 6, in the control using only the conventional speed feedback control, the actual rotation speed of the motor indicated by the waveform Wm is almost constant at about 17000 rpm in the whole air flow range. On the other hand, in the power control according to the present embodiment controlling the driving of the motor 100 while switching between the speed feedback control mode (speed FB control mode) and the current feedback control mode (current FB control mode), as indicated by the waveform Im, in the current feedback control mode, the actual rotation speed Rmv fluctuates between about 17000 rpm and about 15700 rpm when compared with the waveform Wm in the conventional speed feedback control.

In the conventional speed feedback control, the actual rotation speed of the motor is controlled to match the target rotation speed, so the actual rotation speed of the motor is constant around about 17000 rpm, but the drive current increases in the air flow region with the large load on the motor.

On the other hand, in the case of power control executed while switching between the speed feedback control mode and the current feedback control mode according to the present embodiment, when the speed feedback control mode is executed, the actual rotation speed Rmv of the motor 100 is controlled to be about 17000 rpm.

On the other hand, when the current feedback control mode is executed, the actual rotation speed Rmv of the motor 100 is away from about 17000 rpm when compared with the conventional speed feedback control. This is because in the current feedback control mode, even when the load of the motor 100 is large and the actual rotation speed Rmv is lowered, the drive current is limited to about 5.0 A so as to match the current threshold Sth.

While the actual rotation speed of the motor in the conventional speed feedback control is about 17000 rpm, the actual rotation speed Rmv of the motor 100 in the operation region in the current feedback control mode according to the present embodiment decreases to about 16700 rpm. In practice, however, the ratio of the decrease (the rate of decrease of 16700 rpm relative to 17000 rpm) is about 2%, and this ratio is well within the specification range (e.g., ±5% of the target rotation speed) and therefore acceptable.

As described above, the motor drive control device 3 according to the present embodiment controls the actual rotation speed Rmv of the motor 100 to match the target rotation speed Rtg in the speed feedback control mode, and stops the speed feedback control mode and switches to the current feedback control mode when the measured current value as the drive current information Si is not less than the current threshold Sth. This prevents a drive current greatly exceeding the current threshold Sth from flowing to the motor 100 even when the load of the motor 100 increases, by executing the current feedback control mode.

The motor drive control device 3 controls the drive current so that the drive current to the motor 100 matches the current threshold Sth in the current feedback control mode, thus preventing damage to the motor 100, the motor drive unit 90, or the like.

When the actual rotation speed Rmv of the motor 100 within a predetermined range with respect to the target rotation speed Rtg is detected during the execution of the current feedback control mode, the power control unit 60 of the motor drive control device 3 switches to the speed feedback control mode. Specifically, the operation command unit 61 of the power control unit 60 monitors the actual rotation speed Rmv of the motor 100, and when the actual rotation speed Rmv of the motor 100 exceeds a predetermined percentage (X %) with respect to the target rotation speed Rtg or a predetermined value (Y rpm) with respect to the target rotation speed Rtg (X and Y are any numbers), the operation command unit 61 determines the decrease in the load of the motor 100 and returns from the current feedback control mode to the speed feedback control mode.

As described above, when the drive current of the motor 100 can be set to a value lower than the current threshold Sth due to the decreased load of the motor 100 during the execution of the current feedback control mode, flowing an extra drive current to the motor 100 can be prevented by returning from the current feedback control mode to the speed feedback control mode.

As described above, by switching the current feedback control mode and the speed feedback control mode based on the current threshold Sth, the motor drive control device 3 can maintain the air flow-static pressure characteristic (P-Q characteristic) required for the motor 100 while suppressing wasteful power consumption.

The motor drive control device 3, by controlling the driving of the motor 100 while switching between the speed feedback control mode and the current feedback control mode according to the load on the motor 100 in the whole air flow range, can satisfy the current limit required by customer requirements or specifications at not only the operation region but also the whole air flow range determined by the air flow-static pressure characteristic (P-Q characteristic).

Expansion of Embodiments of Present Invention

The invention conceived by the present inventors has been specifically described above based on the embodiments. However, the present invention is not limited to the embodiments, and various modifications can be made without departing from the gist of the present invention.

For example, in the present embodiment, the operation command unit 61 executes the speed feedback control mode at the beginning of driving the motor 100 and then switches to the current feedback control mode. The present invention is not limited to this, but the current feedback control mode may be executed at the beginning of the drive of the motor 100 and then switched to the speed feedback control mode. In other words, either of the control modes may be executed first, and the speed feedback control mode and the current feedback control mode may be alternately switched.

The number of phases of the motor 100 driven by the motor drive control device 3 of the aforementioned embodiment is not limited to three-phase. The number of Hall elements is not limited to three.

The method for detecting the actual rotation speed Rmv of the motor 100 is not particularly limited. For example, a position sensorless method instead of using a position detector such as a Hall element but detecting the actual rotation speed Rmv by using a back electromotive voltage induced in the motor coil, may be used.

The flowchart described above is a specific example and is not limited to this flowchart. For example, other processing may be inserted between each step or processing may be parallelized.

REFERENCE SIGNS LIST

1 Fan system; 2 Host device; 3 Motor drive control device; 4 Control circuit unit; 10 Motor unit; 21 Speed command unit; 22 Power supply unit; 40 Drive control signal generation unit; 41 Speed command analysis unit; 42 Duty ratio determination unit; 43 Energization control unit; 51 Rotation speed monitoring unit; 52 FG signal generation unit; 53 Current monitoring unit; 54 Power supply voltage monitoring unit; 60 Power control unit; 61 Operation command unit; 62 Current feedback unit; 63 Speed feedback unit; 70 Current detector; 90 Motor drive unit; 91 Inverter circuit; 100 Motor; 101 Position detector; Im Waveform indicating actual rotation speed; Rmv Actual rotation speed; Rtg Target rotation speed; Sc Speed command signal; Sd Drive control signal; So Rotation speed signal; Sh Position detection signal; Sv Power supply voltage information; Sr Rotation speed information; Si Drive current information (Measured current value); Sth Current threshold (Target current); S1 Target rotation speed information; S2 Duty ratio information; S3, S4 Operation command information; S5 Current feedback instruction information; S6 Speed feedback instruction information; Vdd Power supply voltage; Vm Voltage; W Air flow-static pressure characteristic; Wm Waveform indicating actual rotation speed

The invention claimed is:

1. A motor drive control device, comprising:

a control circuit unit configured to generate a drive control signal for controlling an actual rotation speed of a motor, based on a speed command signal indicating a target rotation speed of the motor; and a motor drive unit configured to drive the motor based on the drive control signal, wherein the control circuit unit includes a power control unit configured to enable selection of one of:

a speed feedback control mode to generate the drive control signal so that the actual rotation speed of the motor matches the target rotation speed; and a current feedback control mode to generate the drive control signal so that a drive current of the motor matches a target current, and the power control unit is configured to set a current threshold corresponding to a power supply voltage supplied from the outside as the target current; and when detecting the drive current being not less than the current threshold, switch from the speed feedback control mode to the current feedback control mode.

2. The motor drive control device according to claim 1, wherein the power control unit switches from the current feedback control mode to the speed feedback control mode when detecting the drive current being less than the current threshold in the current feedback control mode.

3. The motor drive control device according to claim 1, wherein the power control unit is configured to enable selection of the speed feedback control mode and the current feedback control mode in a whole air flow range from minimum to maximum air flow as determined by air flow-static pressure characteristics of the motor.

4. The motor drive control device according to claim 1, comprising:

a current detector configured to detect the drive current; and a current monitoring unit configured to acquire, as the drive current, a measured current value calculated by smoothing a detected current detected by the current detector.

5. The motor drive control device according to claim 1, wherein the detected current being an analog signal is converted into a digital signal by ΔΣAC.

6. The motor drive control device according to claim 1, wherein the power control unit switches to the speed feedback control mode when detecting, during execution of the current feedback control mode, the actual rotation speed of the motor being within a predetermined range with respect to the target rotation speed.

7. The motor drive control device according to claim 1, wherein the power control unit includes:

an operation command unit configured to switch selectably between the speed feedback control mode and the current feedback control mode;

a current feedback control unit configured to control so that the drive current matches the target current in accordance with a command from the operation command unit; and a speed feedback control unit configured to control so that the actual rotation speed of the motor matches the target rotation speed in accordance with a command from the operation command unit.

8. The motor drive control device according to claim 7, wherein the operation command unit changes the current threshold in accordance with a value of the power supply voltage so that power of the motor is at a desired value.

9. A motor unit, comprising:

a motor to be driven; and a motor drive control device configured to control driving of the motor, wherein the motor drive control device includes:

a control circuit unit configured to generate a drive control signal for controlling an actual rotation speed of the motor, based on a speed command signal indicating a target rotation speed of the motor; and a motor drive unit configured to drive the motor based on the drive control signal, the control circuit unit includes a power control unit configured to enable selection, as a drive control mode, of one of:

a speed feedback control mode to generate the drive control signal so that the actual rotation speed of the motor matches the target rotation speed; and a current feedback control mode to generate the drive control signal so that a drive current of the motor matches a target current, and the power control unit is configured to:

set a current threshold corresponding to a power supply voltage supplied from the outside as the target current; and when detecting the drive current being not less than the current threshold, switch from the speed feedback control mode to the current feedback control mode.

10. A motor drive control method, comprising:

a drive control signal generation step of generating, by a control circuit unit, a drive control signal for controlling an actual rotation speed of a motor to be driven, based on a speed command signal indicating a target rotation speed of the motor; and a motor driving step of driving the motor by a motor drive unit based on the drive control signal, wherein the drive control signal generation step includes a drive control step of enabling selection of, as a drive control mode controlled by a power control unit, one of:

a speed feedback control mode to generate the drive control signal so that the actual rotation speed of the motor matches the target rotation speed; and a current feedback control mode to generate the drive control signal so that a drive current of the motor matches a target current, the drive control step includes, setting a current threshold corresponding to a power supply voltage supplied from the outside as the target current, and when detecting the drive current being not less than the current threshold, switching from the speed feedback control mode to the current feedback control mode.

* * * * *